May 31, 1955  A. CLAUD-MANTLE  2,709,611
HOOD LATCH

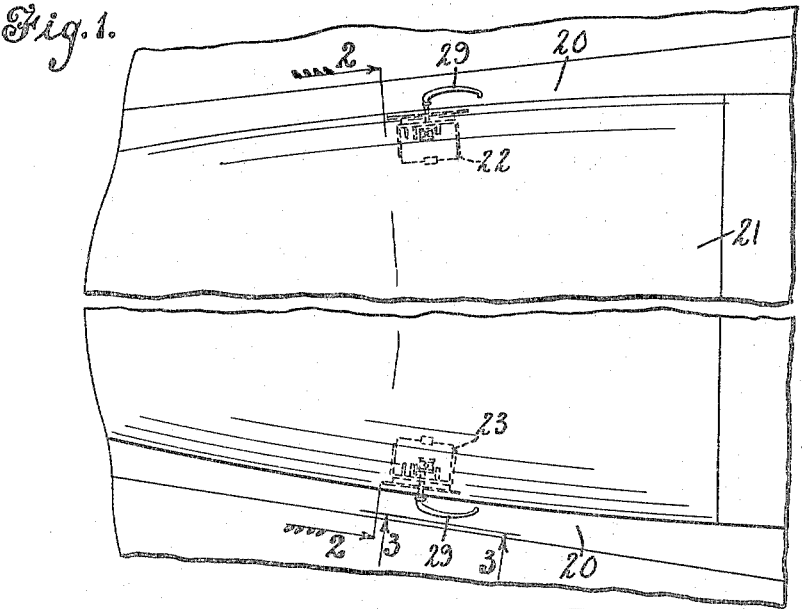
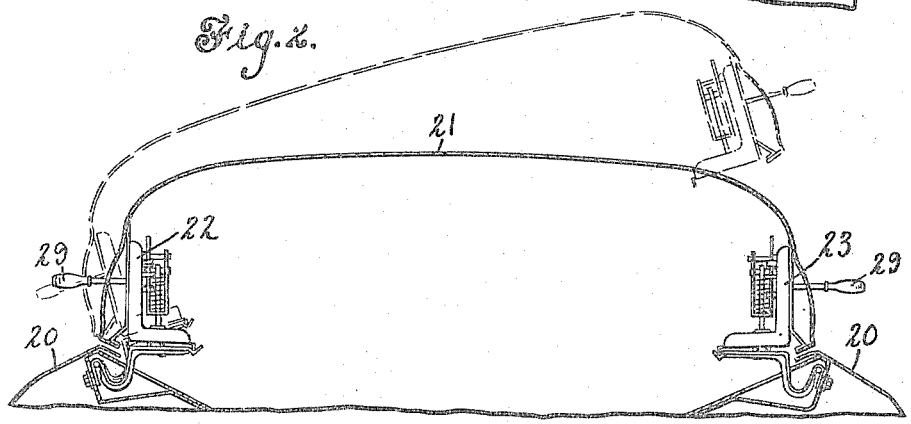
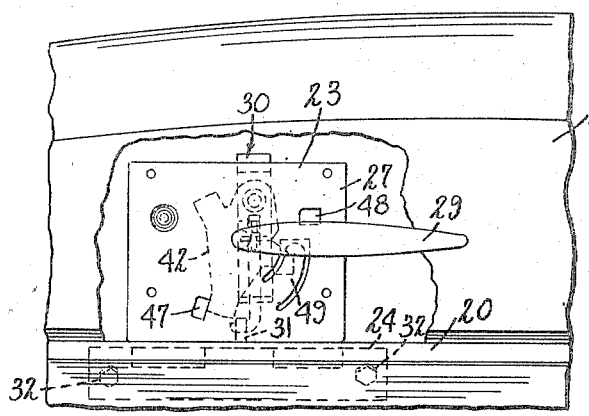

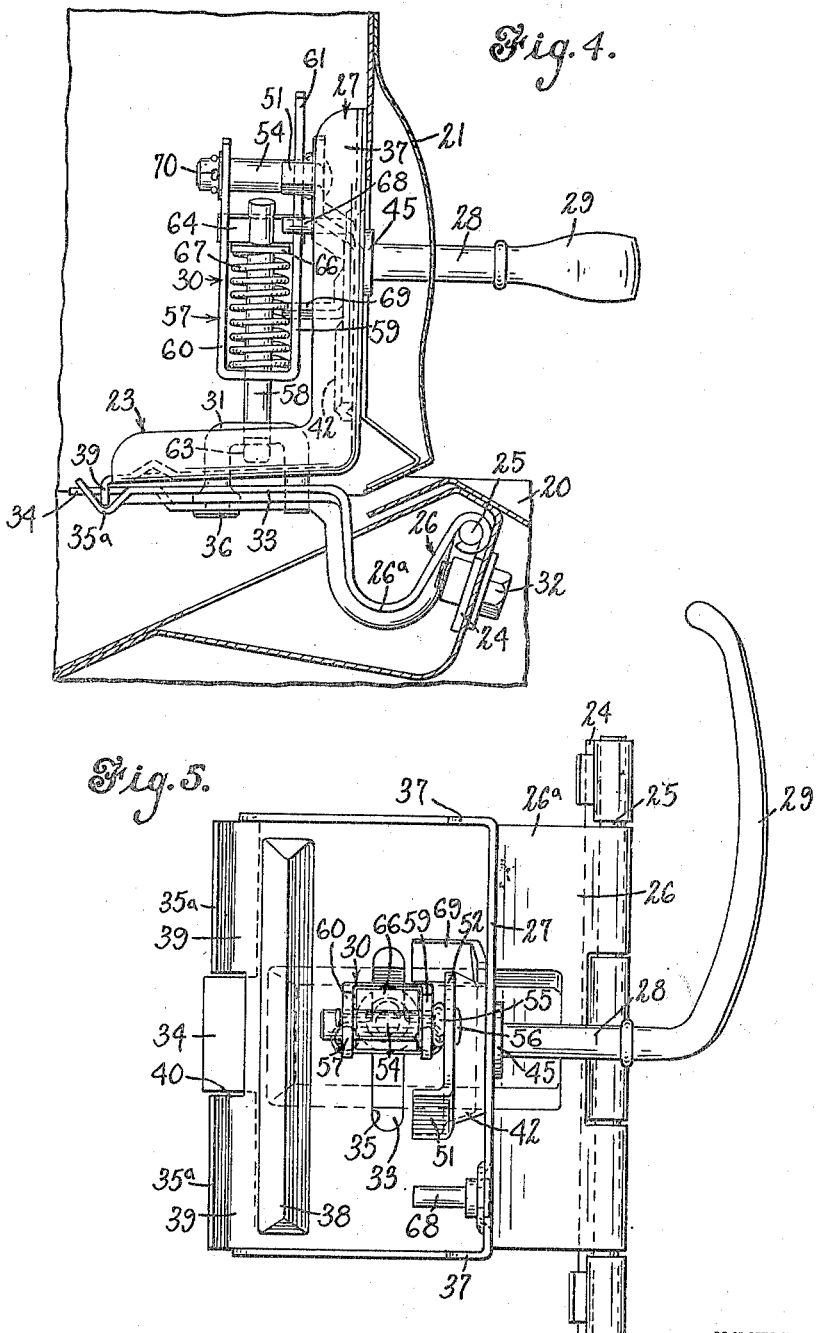

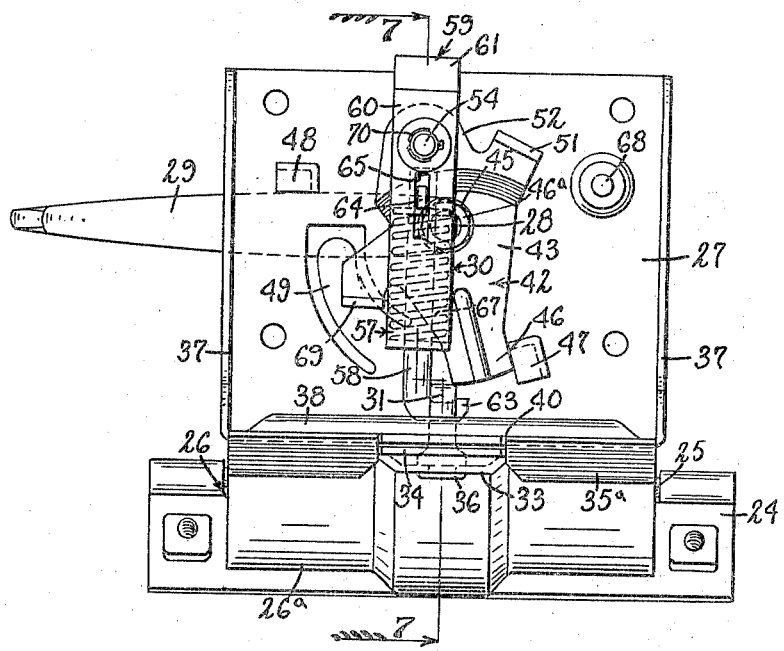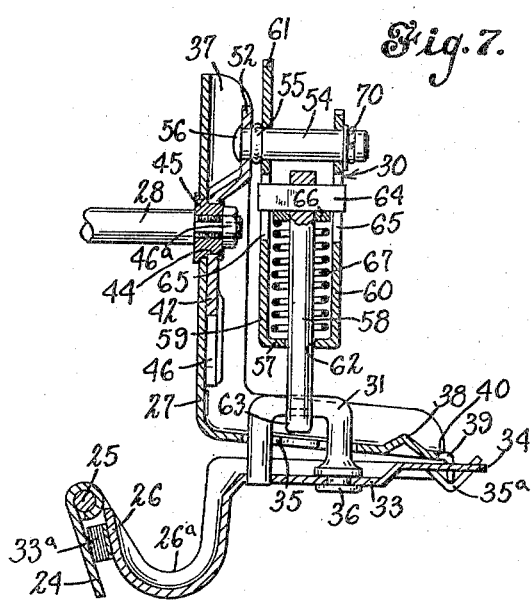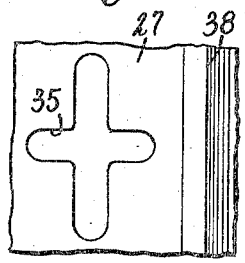

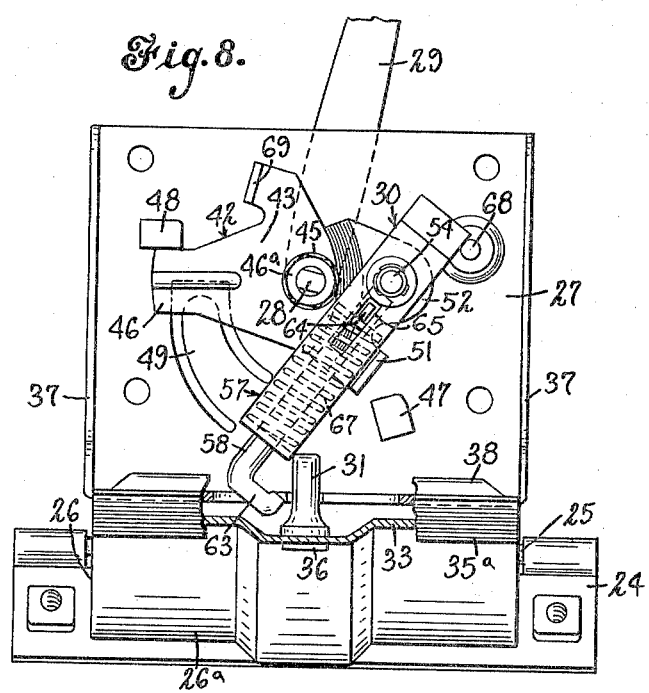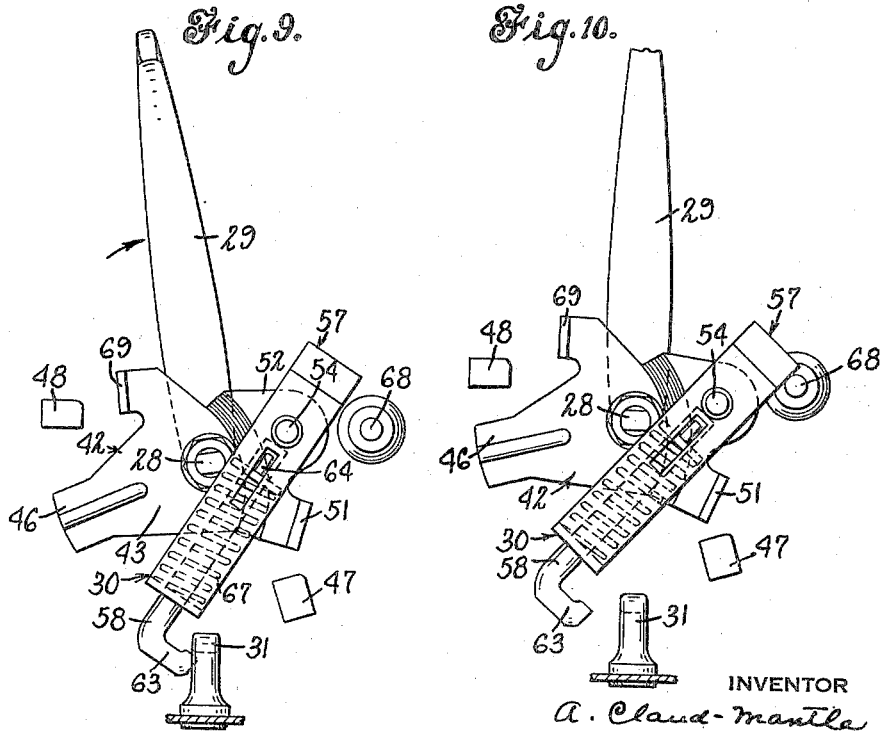

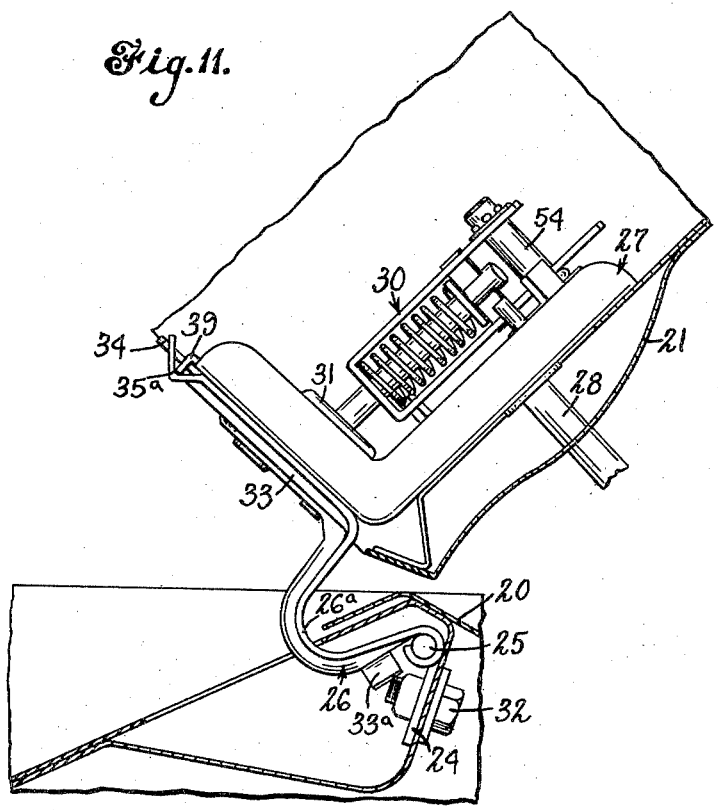
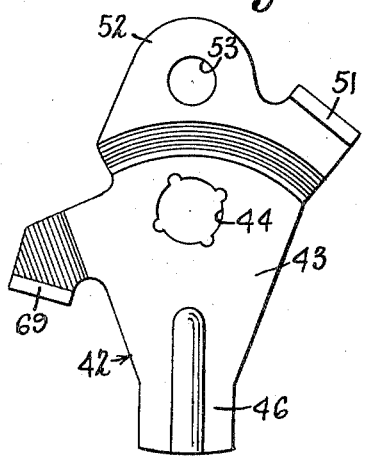
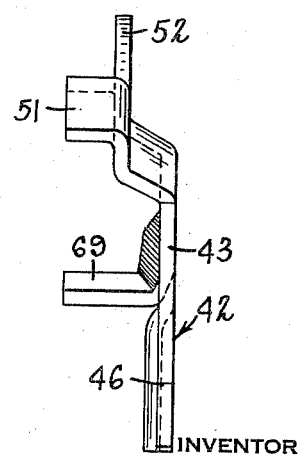

Filed Aug. 27, 1952  6 Sheets-Sheet 6

INVENTOR
A. Claud-Mantle
BY
Rockwell & Bartholow
ATTORNEYS

United States Patent Office 2,709,611
Patented May 31, 1955

2,709,611

HOOD LATCH

Arthur Claud-Mantle, Trumbull, Conn., assignor to The Bassick Company, Bridgeport, Conn., a corporation of Connecticut Application August 27, 1952, Serial No. 306,593

3 Claims. (Cl. 292—113)

This invention relates to hood latches for automotive vehicles and while not restricted thereto, it has particular reference to hood latches used on trucks and delivery cars where there is a manually operable latch located at each side of the hood about midway between the ends. In some cases the hood latch of the present invention is applied to a vehicle in which the hood lid is of the dual-tip variety, the lid extending across the hood and being swingable upwardly from either side, but the improved latch can also be used in connection with lids of other types.

An object of the present invention is to simplify and decrease the cost of the latch mechanism by providing a lid-securing mechanism of the kind above mentioned that is relatively simple in construction and gives very satisfactory service.

A further object is to provide a hood latch of the general type above indicated in which there are very effective provisions for inhibiting vibrations and noise and looseness of the latch parts resulting from wear in service.

Another object of the invention is to provide an improved latch in which the fixed part of the engine enclosure is provided with a relatively stationary keeper and in which the part which cooperates directly with the keeper is a swinging detent of such character that it inhibits the transmission of vibrations to the hood lid upon which the detent member is supported.

Another object is to provide a hood latch comprising upper and lower plates carried by the respective upper and lower hood members, the lower plate being provided with a stationary keeper and the upper plate being equipped with a manually swingable detent member coacting with the keeper, the detent member being provided with a spring means acting to hold the upper hood member yieldingly in the latched position.

In the accompanying drawings:

Fig. 1 is a plan view showing the hood portion of an automobile equipped with hood latches embodying my improvements;

Fig. 2 is a section on line 2—2 of Fig. 1, an upwardly lifted position of the hood lid being indicated in broken lines;

Fig. 3 is an enlarged view taken from the line 3—3 of Fig. 1, with parts broken away showing the latch in the latched position;

Fig. 4 is a fragmentary view on a larger scale, partly in section, showing certain parts appearing at the right of Fig. 2;

Fig. 5 is a top plan view, with certain parts omitted, of the latch structure shown in Fig. 4;

Fig. 6 is an elevation of the latch mechanism shown in Figs. 4 and 5, looking from the inner side of the upper plate;

Fig. 7 is a section on line 7—7 of Fig. 6;

Fig. 7A is a detail showing the keeper aperture in the upper mounting plate;

Fig. 8 is a view similar to Fig. 6, but partly in section, showing the detent member in a position to penetrate the keeper;

Fig. 9 is a diagrammatic view showing the position of the parts at a certain stage when the latch is being released;

Fig. 10 is a view similar to Fig. 9 showing the position of the parts at a later stage;

Fig. 11 is a view similar to Fig. 4, showing the position of the parts when the lid has been lifted;

Fig. 12 is a detail face view of the lever which pivotally supports the detent member;

Fig. 13 is an edge view of this lever;

Figure 14:
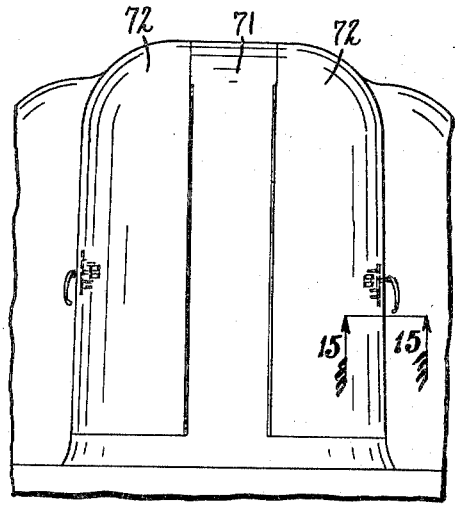
Fig. 14 is a top plan view of a hood equipped with a modified form of latch.

In the form of device illustrated in Figs. 1 to 13 inclusive, two latch devices embodying my improvements are shown, each being applied to the hood intermediate of the hood ends and serving to secure the lid at the side margin by action upon the hood lid at its intermediate part, the latching and releasing action of each device being effected by turning movement of a horizontal spindle or shaft equipped at the outer side of the hood lid with a suitable manual manipulating member or handle. In this form the manipulating handle, when the device is in the latched position, extends at one side longitudinally beyond the associated upper mounting plate so as to have a substantially horizontal position at one side of the lid, and as in this particular case it is desired to have the manipulating members stand rearwardly from the latch in the fastened position, as shown in Fig. 1, the two latch devices are of opposite hand. However, as the two devices shown are substantially identical so far as structure and operation are concerned, a description of one will suffice, the device shown in detail in the drawings being that appearing at the right of Fig. 2.

In this form of the invention the hood has a dual-tip lid which can be swung upwardly from either side and can, if desired, be entirely removed from the engine enclosure. For this purpose each latch comprises in its structure, a hinge in which a pintle or like pivoting element hinges together two parts, one of which is secured in fixed position at the marginal part of the engine enclosure and the other of which is a plate-like element adapted to be positioned substantially horizontally within the engine enclosure at the upper part thereof and is equipped with latch mechanism whereby it is adapted to be latched to and released from another plate-like member which is adapted to be mounted at the inner side of the hood lid and carries upon it a part of the latching mechanism including a manipulating member or operating handle connected to a suitable operating spindle or shaft. This last-mentioned plate-like member is generally of L-shape having an upright portion and a generally horizontal portion, the upright portion serving as a mounting for the substantially horizontal spindle or shaft which spindle or shaft is operably connected to a swinging detent arm. This swinging detent arm is adapted to cooperate with a keeper in stationary position upon the lower plate-like member. The detent arm comprises in its structure two members which are relatively slidable with respect to each other, one of these members cooperating directly with the keeper as hereinafter described and being acted upon by a spring or like resilient element as will hereinafter appear.

In the drawings, the hood or engine-enclosing structure of an automobile is shown in Figs. 1, 2 and 3 and here the fixed part of the hood is indicated at 20 and the lid at 21, the lid being latched to and hingedly connected to the marginal portions of the part 20 at its respective sides by means of latch devices generally indicated at 22 and 23. In Figs. 3 to 13 inclusive the detail structure of the latch device 23 is shown.

In the drawings, the part fastened to the marginal portion of the engine enclosure is indicated at 24, the pintle at 25, the plate-like part connected by pintle 25 to part 24 is indicated at 26, the L-shaped plate at 27, the operating shaft or spindle at 28, and the handle on the operating spindle at 29. The detent member previously referred to is indicated generally at 30 and the fixed keeper carried by the lower plate is indicated at 31.

Referring now more particularly to the details of the structure, the part 24 is preferably a relatively narrow strip or plate secured in substantially horizontal position to the marginal part of the engine enclosure by means such as bolts 32. As shown in Fig. 4 the plate 24 may be in a substantially upright plane. Means such as leaf-springs 33a (Fig. 7) may be interposed between the plates 24 and 26 for holding the main part or body of plate 26 normally in approximately horizontal position, as shown in Figs. 4 and 7. Near the hinge pintle 25, the plate 26 may have a U-shaped portion indicated at 26a so as to clear the adjacent sheet-metal work when the lid is swung upwardly, as shown in Fig. 11. The U-shaped part 26a of plate 26 is integral with a portion 33, which in the position of Fig. 4 is substantially horizontal, and the plate 26 preferably has a transverse groove in the U-shaped portion 26a and in the flat portion 33 for the purpose of reinforcing the plate structure.

At the inner end and at the middle part the plate portion 33 is provided with a part 34 in the nature of a tongue which is flat and projects inwardly past V-shaped portions 35a formed in the plate portion 33 at the respective sides of the part 34. The V-shaped portions 35a, which are formed in the plate by bending the metal, provide valleys or V-shaped seats adapted to receive down-turned lip portions provided upon the L-shaped mounting plate 27, as hereinafter described. The structure adjacent the inner ends of the lower plate 26 and upper plate 27 is similar to that shown in my application Serial No. 273,892, filed February 28, 1952.

The keeper 31 is substantially in the form of an inverted U arranged in a vertical plane that is located transversely with respect to the flat portion of the lower plate and is adapted to extend upwardly through an aperture 35 provided in the substantially horizontal lower portion of the upper plate 27. In this particular form the U-shaped keeper has its legs extending through holes in the plate 26 and one of the legs has a shouldered part that is held in place in the plate by riveting over one end of the leg, as indicated at 36.

The upper mounting plate 27 is provided with integral side flanges 37 on its upright and horizontal portions. The keeper aperture 35 is in proximity to the juncture between the upright and horizontal portions of plate 27. The inner part of plate 27 beyond the keeper aperture has an upwardly crowned portion 38 extending throughout most of the length of the plate, and inwardly of this portion 38 are integral down-turned lips 39 that are adapted to engage in the valleys or seats provided by the V-shaped portions 35a of the lower plate 26 at each side of the tongue-like part 35, as shown in Figs. 4 and 5. Between the lip portions 39 there is a cut-away portion 40 provided at the margin of the upper plate which enables the upper plate to accommodate the projecting tongue-like part 34 of the lower plate in a manner to locate the two plates relatively to each other in a longitudinal direction and prevent relative displacement in such direction. The upright portion of the upper plate is provided with holes for the necessary fastening members by which the upper plate is secured to the side wall of the hood lid.

The shaft or spindle 28, previously mentioned, has an inner end which extends through the upright part of plate 27 so that a portion of the shaft is located adjacent the inner face of the mounting plate and this portion of the shaft is rigidly connected to a lever 42 upon which the detent member 30 is supported. In detail, the structure of the lever 42 is as shown in Figs. 12 and 13. This lever has a body portion 43 provided with an aperture 44. The shaft 28 extends through a bushing 45 mounted in the plate 27 and through the aperture 44 and is rigidly fastened to lever 42 by means such as a nut 46a engaging threads on shaft 28, the arrangement being such that the lever is rigid with the shaft so as to turn with the shaft. As shown in Fig. 12, the lever 42 has a downwardly extending portion 46 and this portion serves to limit the swinging movement of the lever by making contact with a stop 47 formed integrally with the plate 27 and another stop 48 also formed integrally with the plate 27. The movement of the lever is also under the control of a resilient friction finger 49 which may be made integrally with the plate 27 and which coacts with the portion 46 of the lever for the purpose of exerting yielding pressure against the lever to hold it against displacement. At the upper part of the lever as shown in Fig. 12 is a flange 51 which serves as a stop member, as hereinafter pointed out, and at the upper part of the lever (Fig. 12) is an ear-shaped portion 52 having a round hole 53 which is employed for connecting the detent member 30 with the upper end portion of the lever. The portion 52 is offset somewhat from the plane of the body portion of the lever 42, and the body portion is placed against the mounting plate, the offset portion being spaced inwardly from the mounting plate, as shown in Fig. 7.

The hole 53 in lever 42 is used for mounting a pin 54 that supports the detent member 30. The pin 54 extends inwardly from the lever and has a shouldered portion 55 that is tightly held in fixed position against the face of the lever by having the extremity of the pin riveted over at the opposite side of the hole 53 as indicated at 56. In this manner the pin 54 is rigidly held in an inwardly extending position. The pin 54 serves as a pivotal mounting for a frame member 57 which is one member of the detent, the other member being a stem 58 which is slidable relatively to the frame 57. The frame 57 is bent up from sheet metal in the form of a U, the upper part of which is swingingly mounted on the pin 54 by means of holes in the frame through which the pin passes. As shown in Fig. 7 the frame 57 has a leg 59 and parallel to it a leg 60. The leg 59 which is the one that is closer to the upright part of the mounting plate has an upper end portion 61 which is extended upwardly beyond the upper end of the leg 60. The stem 58 has its upper end (Fig. 7) located in the frame 57 beneath the pin 54 and intermediate of its ends it passes through a guide hole 62 in the lower part of the frame. At its lower end the stem 58 is bent to one side to form a shallow hook 63 adapted to be engaged with the transverse portion of the keeper 31.

Adjacent the upper end of the stem 58 the latter has fixed to it a cross piece 64 the ends of which are guided in slots 65 in the legs of the frame 57, these slots being disposed lengthwise of the frame and serving to guide the stem as the latter moves lengthwise with respect to the frame. Immediately below the cross piece 64 a washer 66 is placed about the stem and a helical compression spring 67 is interposed between this washer and the bottom part of the frame 57. The tendency of this compression spring is to raise the stem with respect to the frame to the upper limit of its movement, the upward movement being limited by the engagement of the upper end of the stem with the body of the pin 54.

The extended upper end portion 61 of the frame 57 under certain conditions will make contact with a fixed stop element such as a stop pin 68 projecting inwardly from the mounting plate 27, this pin 68 being to the right of the lever 42 as shown in Fig. 6. The lug 51 of the lever is to the right of the detent member as shown in Fig. 6, and this lug 51 in the position of Fig. 8 is adapted to be engaged by the longer leg of the frame 57 for the purpose of limiting swinging movement of the detent member in a counter-clockwise direction relatively to the lever 42.

It will be noted from Fig. 12 that there is provided on the lever a lug 69. This lug in the position of Fig. 6 is located to the left of but close to the frame 57, and this lug is adapted to be engaged by the longer leg of the frame 57 for the purpose of limiting swinging movement of the detent member in a clockwise direction relatively to the lever 42.

The detent member is assembled with relation to the pin 54 of the carrying lever by placing the perforated upper end portions of the frame over the pin 54 after which a cotter pin 70, or the like, is placed in position in the distal end portion of the pin.

The longitudinal upward or inward movement of the stem 58 relatively to its supporting frame 57 is limited by the pivot 54 with which the inner end of the stem is engageable. Therefore, it will be understood that when the hooked end 63 of the stem is disengaged from the keeper 31, the other end of the stem 58 abuts the pivot 54 and is held in strong frictional engagement therewith by the spring 67 so as to resist relative turning movement between the pivot 54 and the stem 58. Hence, when the stem 58 is disengaged from the keeper 31, the composite detent member may rotate bodily with the lever 42 unless or until the frame 57 of the composite detent member is engaged by the abutment 68.

Fig. 6 shows the latch in the fully closed condition in which the bale-like keeper 31 is penetrated by the lower hooked end 63 of the stem and firmly engaged therewith, the upper end of the stem member 58 being spaced downwardly from the pivot 54 and the spring 67 being strongly compressed. In the fully engaged condition of the latch, the composite detent member is disposed in an overcenter position, as will be noted from Fig. 6, the pivot pin 54 and hooked lower end of the stem 58 being in an imaginary line which is to the left of the turning axis of the lever 42. In this position, the latched parts are very firmly held and dislocation of the parts is strongly inhibited. As viewed in Fig. 6, movement of the operating handle 29 and the lever 42 in a clockwise direction further compresses the spring 67 until the pivot 54 passes dead center. Continued rotation of the operating handle 29 with the lever 42 after the pivot 54 passes dead center, effects a downward movement of the frame 57, thereby permitting the stem 58 to move relatively upwardly in the frame 57 until the upper end of the stem 58 abuts the pivot 54. When the upper end of the stem 58 is in engagement with the pivot 54 to limit further upward movement of the stem 58 relatively to the frame 57 and resist turning movement of the stem relatively to the pivot 54, continued rotation of the operating handle member 29 with the lever 42 in a releasing direction effects a downward swinging movement of the stem 58 with the lever 42, the lever 42 and the composite detent member moving in a clockwise direction, as viewed in Fig. 6, thereby releasing the keeper 31 as shown in Fig. 9. Continued swinging movement of the operating handle 29 from the position of Fig. 9 to the position of Fig. 10 effects further downward swinging movement of the composite detent member with the pivot 54 eccentrically mounted on the lever 42. As shown in Fig. 10, the composite detent member has been swung down to a position in which the frame 57 is in engagement with the abutment 68 above the pivot 54. Hence, it will be understood, that as movement of the operating handle 29 in a releasing direction is continued from the position of Fig. 10 to the position of Fig. 8, the composite detent member is swung counterclockwise on the pivot 54 by the abutment 68 to the position shown in Fig. 8. From the foregoing, it will be understood that the abutment 68 serves to swing the composite detent member on the axis of the pivot 54 to depress the hooked end of the stem 58 to the position shown in Fig. 8.

It will also be understood that when the latch at one side of the hood is released, the last-mentioned side of the hood may be swung upwardly. As shown in Fig. 8, the operating handle 29 is at a slight angle to the vertical and the reduced or tail part of the lever 42 is engaged with the stop 48 to limit rotation of the lever in a clockwise or unlatching direction. The permissive throw of the operating handle to the Fig. 6 position is approximately 105°. When the latch parts are in the position shown in Fig. 8, the frame 57 is engaged with the abutment 51 of the lever, and thus dislocation of the composite detent member in a direction to interfere with closing of the lid is prevented by the stop 51 while the lid is open, the stop 51 limiting swinging movement of the composite detent member relatively to the lever 42.

To latch the lid, the lid is closed and the operating handle 29 is swung from the position of Fig. 8 to the position of Fig. 6. Owing to the aforementioned depressed condition of the hooked end 63 of the stem when the operating handle is in the position of Fig. 8, the hooked end 63 of the stem may penetrate the keeper 31 even though the hood lid is not tightly closed when the operating handle 29 is moved from the position of Fig. 8 to the latched position thereof. As the operating handle 29 is swung in a closing direction from the position of Fig. 8, the hooked end 63 of the stem penetrates the keeper and engages the latter, the frame 57 being swung upwardly with the eccentric pivot 54 provided on the lever 42, and the stem 58, having the hooked end 63 thereof engaged with the keeper 31, sliding downwardly relatively to the frame 57, thereby further compressing spring 67 until the pivot 54 passes dead center. When the pivot 54 passes dead center as the operating handle 29 is rotated in a closing direction, the latch has a snap action as the spring 67 is permitted limited expansion. The composite detent member then assumes the position thereof shown in Fig. 6. As shown in this view, the tail piece 46 of the lever is engaged with the stop 47 to limit further rotation of the lever in a counterclockwise direction, and the inner end of the stem 58 is spaced outwardly from the pivot 54. From the foregoing, it will be understood that the toggle-like or stem member 58 has a spring-pressed lost-motion connection with the frame 57 through which the stem 58 exerts a resilient downward pull on the hood lid when engaged with the keeper 31. Under these circumstances the upper and lower latch plates are in engagement only at their inner lip portions as shown in Fig. 7, the opposing portions of the plates being at an acute angle to each other. In this position the lid is held down against the action of the spring which is interposed between the detent stem and the detent frame, the effect being to hold the lid in position yieldingly or in a cushioned manner. By the interposition of the spring means between the detent stem and the detent frame the transmission of vibrations from the lower part of the hood to the hood lid is prevented and noise is reduced and looseness and wear taken up.

It will be noted that in the form shown the keeper is in substantially the same vertical plane as the turning axis of the carrier lever 42, that in the unlatched position (Fig. 8) the pivot of the detent arm is to one side of this plane and that in the latched position the pivot is at the opposite side, with the spring 67 acting to oppose the return movement of the detent arm.

It will be seen from the foregoing that in the operation of latching the lid to the fixed lower part, that is, moving the latching members to the position shown in Fig. 6, the turning movement of the carrying lever causes the detent member to be moved upwardly bodily and while this movement is occurring the detent member is swinging on the axis of its carrying pin so as to bring the stem hook laterally into engagement with the keeper.

In the operation of moving from the latched position of Fig. 6 to the fully released position of Fig. 8, the latch members go through the two stages shown in Figs. 9 and 10. As the handle is lifted the detent member swings clockwise on its pivot as shown in Fig. 9 to disengage the keeper and the upper end of the detent frame moves toward the stop pin 68. In the later stage, shown in Fig. 10, the stem hook has moved farther to the left and the upper end of the detent frame has come into contact with the stop pin 68. In moving from the Fig. 9 position to the Fig. 10 position, the detent member does not swing relatively to the carrying lever because friction between the parts (the stem 58 being pressed strongly against the pin 54) is such as to maintain their relationship. As soon, however, as the upper end of the detent frame engages the pin or abutment 68 the detent frame is in a position in which its rotation about the lever axis cannot continue, and the detent member is swung counter-clockwise with respect to its carrying pivot, thus causing the detent hook to be depressed, and this hook will finally reach the depressed position shown in Fig. 8. Then as the lid is relatched, the first movement of the detent hook is a lateral movement from the Fig. 8 position which will effectively engage the hook under the cross member of the keeper. In a latch for a dual-tip lid, as above described, the coaction of the upper and lower mounting plates will be substantially as described in my copending application referred to above, the effect of the two latches at the opposite sides of the hood being to place the hood lid under tension in a generally transverse direction, the only engagement between the lower mounting plate and the upper one being at the inner margins of the plates.

Figure 15:
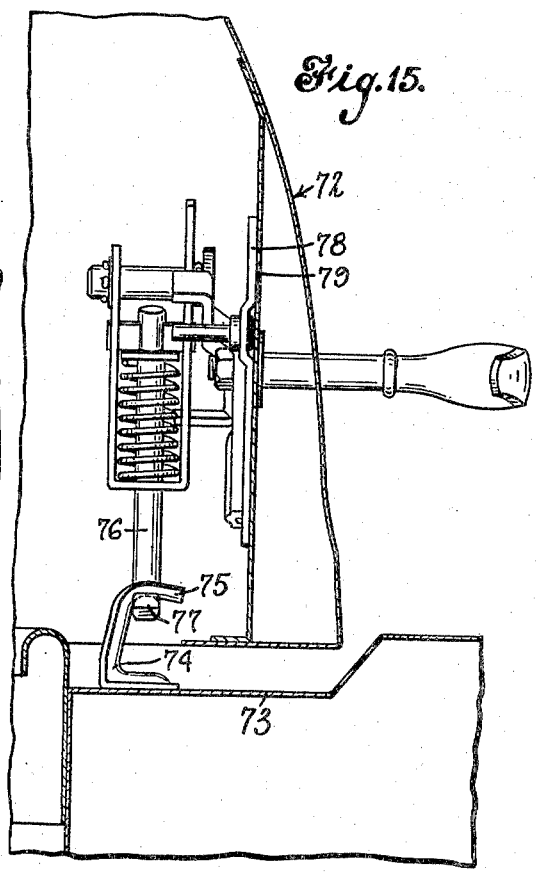
Fig. 15 is an enlarged section on line 15—15 of Fig. 14.
Figure 16:
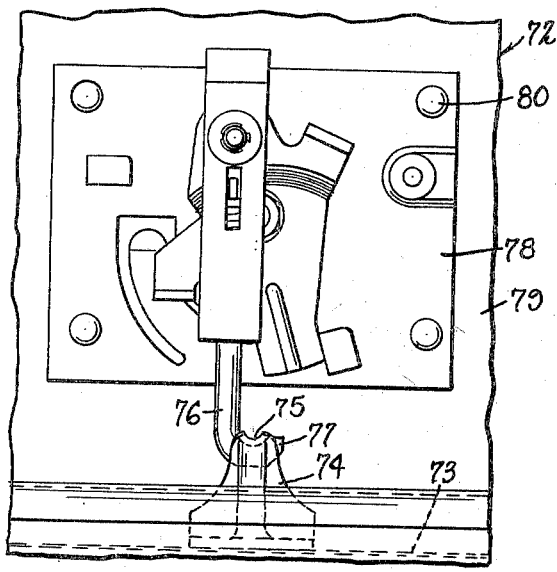
Fig. 16 is an elevation of the latch shown in Fig. 15, looking toward the inner side of the upper mounting plate.

In the form of the invention shown in Figs. 14 to 16 inclusive, the hood is of a different type, having a fixed median longitudinal part 71 at the respective sides of which are hinged panels or lid members 72. With such a hood structure the keeper, instead of being mounted on a hinged plate, is fixed in position on the lower part of the engine enclosure. In this modified form the lower part of the engine enclosure is provided with a shelf 73 on which is fixed a keeper bracket 74 made of sheet metal and having a laterally bent upper end portion 75. In this embodiment the detent stem 76 has a somewhat curved laterally-bent hook 77 that is adapted to engage under the overhanging part 75 of the keeper. The overhanging part 75 of the keeper is pointed toward the side of the hood as shown in Fig. 15. Aside from these variations, the installation is similar to that first described, the latch structure being applied to the lid at the inner face of the latter but the lower mounting plate being omitted. In this case, the upper mounting plate 78 of the latch, which carries as before the operating handle, the carrying lever and the detent member, is a plate lying mostly in a single plane, said plate being fastened to an adjacent wall 79 of the hood lid by means such as fastening members 80. The movement of the detent member relatively to the keeper is substantially as described above.

It will be apparent that the invention provides a relatively inexpensive and simple latch structure embodying effective provisions for inhibiting vibrations in the hood lid and noise and looseness in the latch parts. By providing the latch with a relatively fixed keeper and with a composite detent member embodying relatively movable parts (and more specifically relatively slidable parts), and an interposed spring or cushion member, the latch is considerably improved in comparison to prior devices. The detent member is actuated through rotation of a spindle or a shaft having an operating handle, and notwithstanding this relatively simple mode of operation the detent member having a hook or the like to engage the keeper has the necessary movements required for satisfactory operation of the device in latching the hood and releasing the hood. As far as the releasing step is concerned, the latch construction is such that after the lid has been released and lifted, the upper part of the latch will be in proper position for reclosing the hood. The device is also provided with simple and effective means for limiting the movement of the carrying lever and the movement of the detent.

The organization of parts in the herein described detent member is an important feature of the invention and also the manner of mounting the detent member and other parts so that the latching mechanism moves to an over-center position, i. e., the latching position, by a snap action.

The two embodiments herein illustrated are by way of example only and various modifications and changes in the details can be made without departing from the principles of the invention or the scope of the claims.

What I claim is:

1. In a hood latch for use with a hood having a lower fixed part and an upper liftable lid, a lower mounting plate portion carried by the fixed part of the hood and having an upwardly extending keeper, an upper mounting plate portion extending upwardly and carried by the lid, a spindle mounted in said upper plate portion for turning movement on a substantially horizontal axis, said spindle having an operating handle disposed externally of the lid, a lever rigid with said spindle disposed inwardly of said upper plate portion and swingable on said spindle in a substantially vertical plane, said lever having means cooperating with means provided on said upper plate portion to limit swinging movement of the lever, said lever having a portion thereof extending upwardly from the spindle when the lid is in latched position and provided with an inwardly extending fixed pivot, an elongated frame mounted on said pivot intermediate the ends of the frame for swinging movement in a substantially vertical plane, said frame being penetrated by said pivot and being swingable thereon relatively to said lever, and a stem having an outer hooked end for engagement with said keeper, said stem being extensible from one end of said frame and being spring biased in a direction toward said pivot, the inner end of said stem being engaged with said pivot to resist movement therebetween when the stem is disengaged from said keeper whereby said stem may be swung in a latching direction with said lever to engage the stem with the keeper, the keeper extending substantially transversely of said upper plate portion, said upper plate portion being provided with an abutment engageable with the other end of said frame as said lever is swung in an unlatching direction, and said abutment being engageable with said frame to swing the latter on said pivot in a direction to depress the hooked end of the stem so that full engagement of the latter with the keeper is insured when the lever is swung in the latching direction.

2. In a hood latch for use with a hood having a lower fixed part and an upper liftable lid, a lower mounting plate portion carried by the fixed part of the hood and having an upwardly extending keeper, an upper mounting plate portion extending upwardly and carried by the lid, a spindle mounted in said upper plate portion for turning movement on a substantially horizontal axis, said spindle having an operating handle disposed externally of the lid, a lever rigid with said spindle disposed inwardly of said upper plate portion and swingable on said spindle in a substantially vertical plane, said lever having means cooperating with means provided on said upper plate portion to limit swinging movement of the lever, said lever having a portion thereof extending upwardly from the spindle when the lid is in latched position and provided with an inwardly extending fixed pivot, an elongated frame mounted on said pivot intermediate the ends of the frame for swinging movement in a substantially vertical plane, said frame being penetrated by said pivot and being swingable thereon relatively to said lever, and a stem having an outer hooked end for engagement with said keeper, said stem being extensible from one end of said frame and being spring biased in a direction toward said pivot, the inner end of said stem being engaged with said pivot to resist movement therebetween when the stem is disengaged from said keeper whereby said stem may be swung in a latching direction with said lever to engage the stem with the keeper, the keeper extending substantially transversely of said upper plate portion, said upper plate portion being provided with an abutment engageable with the other end of said frame as said lever is swung in an unlatching direction, and said abutment being engageable with said frame to swing the latter on said pivot in a direction to depress the hooked end of the stem so that full engagement of the latter with the keeper is insured when the lever is swung in the latching direction, and said lever being provided with an abutment engageable with said frame to limit swinging movement of the latter relatively to said lever so that dislocation of the hooked end of the stem in a direction to interfere with the closing of the lid is inhibited.

3. In a hood latch for use with a hood having a lower fixed part and an upper liftable lid, a lower mounting plate portion carried by the fixed part of the hood and having an upwardly extending keeper, an upper mounting plate portion extending upwardly and carried by the lid, a spindle mounted in said upper plate portion for turning movement on a substantially horizontal axis, said spindle having an operating handle disposed externally of the lid, a lever rigid with said spindle disposed inwardly of said upper plate portion and swingable on said spindle in a substantially vertical plane, said lever having a tailpiece cooperating with spaced stops provided on said upper plate portion to limit swinging movement of the lever, said lever having a portion thereof extending upwardly from the spindle when the lid is in latched position and provided with an inwardly extending fixed pivot pin, an elongated frame having opposite plate portions pivoted on said pivot pin intermediate the ends of the frame for swinging movement in a substantially vertical plane and relatively to said lever, said plate portions of the frame being slotted longitudinally thereof, and a stem having an outer hooked end for engagement with said keeper and having a cross piece guided lengthwise of the frame in the slots provided in the plate portions thereof, said stem being extensible from one end of the frame and being spring biased in a direction toward said pivot pin, the inner end of said stem being engaged with said pivot pin to resist movement therebetween when the stem is disengaged from said keeper whereby said stem may be swung in a latching direction with said lever to engage the stem with the keeper, the keeper extending substantially transversely to said upper plate portion, said upper plate portion being provided with an abutment engageable with the other end of said frame as said lever is swung in an unlatching direction, said abutment being engageable with said frame to swing the latter on said pivot pin in a direction to depress the hooked end of the stem so that full engagement of the latter with the keeper is insured when said lever is swung in the latching direction, and said lever being provided with an abutment engageable with the frame to limit swinging movement of the latter relatively to said lever so that dislocation of the hooked end of the stem in a direction to interfere with the closing of the lid is inhibited.

References Cited in the file of this patent

UNITED STATES PATENTS

| | | |
|---|---|---|
| 1,394,962 | Bate | Oct. 25, 1921 |
| 1,669,020 | Prime | May 8, 1928 |
| 1,815,540 | Black | July 21, 1931 |
| 1,931,850 | Moore | Oct. 24, 1933 |
| 2,275,128 | Campbell | Mar. 3, 1942 |
| 2,311,965 | Reynolds | Feb. 23, 1943 |
| 2,378,654 | Pekny | June 19, 1945 |